(12) United States Patent
Goodman

(10) Patent No.: US 7,832,696 B2
(45) Date of Patent: Nov. 16, 2010

(54) CAMERA MOUNTING SYSTEMS

(76) Inventor: Robert Goodman, 986 9th St., Barron, WI (US) 54812

( * ) Notice: Subject to any disclaimer, the term of this patent is extended or adjusted under 35 U.S.C. 154(b) by 139 days.

(21) Appl. No.: 11/977,789

(22) Filed: Oct. 26, 2007

(65) Prior Publication Data
US 2008/0099655 A1    May 1, 2008

Related U.S. Application Data

(60) Provisional application No. 60/855,600, filed on Oct. 31, 2006, provisional application No. 60/963,729, filed on Aug. 7, 2007.

(51) Int. Cl.
*F16M 11/02* (2006.01)

(52) U.S. Cl. .............. 248/181.1; 248/288.31; 248/182.1; 403/122

(58) Field of Classification Search ............. 248/323, 248/324, 339, 340, 317, 181.1, 181.2, 182.1, 248/187.1, 288.31; 396/5, 419, 428; 403/76, 403/90, 114, 122, 127
See application file for complete search history.

(56) References Cited

U.S. PATENT DOCUMENTS

| | | | |
|---|---|---|---|
| 704,666 A * | 7/1902 | Stephens ............ 248/207 |
| 1,170,096 A * | 2/1916 | Nicholson .......... 248/126 |
| 1,408,900 A * | 3/1922 | Miller et al. ........ 248/230.8 |
| 1,582,381 A * | 4/1926 | Citero ............... 248/217.4 |
| 2,375,214 A * | 5/1945 | Creedon ............. 248/126 |
| 3,776,649 A * | 12/1973 | Kemezys ............ 403/90 |
| 5,092,552 A * | 3/1992 | Dayton et al. ....... 248/280.11 |
| 5,351,923 A * | 10/1994 | Booth, Jr. .......... 248/217.1 |
| 5,497,214 A * | 3/1996 | Labree ............... 396/428 |
| 5,622,342 A * | 4/1997 | Mills ................. 248/126 |
| 5,669,592 A * | 9/1997 | Kearful .............. 248/217.4 |
| 6,349,905 B1 * | 2/2002 | Mills ................. 248/126 |
| 6,966,528 B1 * | 11/2005 | Hare ................. 248/178.1 |
| 7,455,271 B2 * | 11/2008 | Pincek et al. ....... 248/288.31 |
| 2009/0010637 A1 * | 1/2009 | DeWitt ............... 396/428 |

* cited by examiner

*Primary Examiner*—A. Joseph Wujciak, III
(74) *Attorney, Agent, or Firm*—Westman, Champlin & Kelly, P.A.

(57) ABSTRACT

Embodiments of camera mounting systems are disclosed. Certain embodiments include a ball swivel mechanism that joins a camera mounting plate to a bracket arm. In some embodiments, the bracket arm is joined to a grip plate that can be secured to an object such as a tree. In other embodiments, the bracket arm is joined to a monopod that can be secured to the ground. Some embodiments of camera mounting plates are configured to secure multiple types of game-security cameras.

14 Claims, 7 Drawing Sheets

CAMERA MOUNTING SYSTEMS

REFERENCE TO RELATED CASES

The present application claims priority of U.S. provisional patent applications Ser. No. 60/855,600, filed Oct. 31, 2006, and Ser. No. 60/963,729, filed on Aug. 7, 2007, the contents of which are hereby incorporated by reference in their entirety.

BACKGROUND

Camera mounting systems are useful for positioning cameras to take photographs. Camera mountings systems can be used to secure a camera in a more reliable fashion than a person could. Camera mounting systems can also be used to secure a camera in locations or in positions that a person could not achieve.

Cameras come in many configurations and styles. One type of camera is a game camera, or sometimes known as a game-security camera. A popular, but not necessary feature of game-security cameras, is motion detection capability. Common configurations can be programmed to take a photograph when motion is detected. One use for this capability is to scout game animals such as deer. Game-security cameras come in many configurations and are often not compatible with mounting systems used with other styles of cameras.

SUMMARY

Embodiments of camera mounting systems are disclosed. Certain embodiments include a ball swivel mechanism that joins a camera mounting plate to a bracket arm. In some embodiments, the bracket arm is joined to a grip plate that can be secured to an object such as a tree. In other embodiments, the bracket arm is joined to a monopod that can be secured to the ground. Some embodiments of camera mounting plates are configured to secure multiple types of game-security cameras.

DETAILED DESCRIPTION OF EMBODIMENTS

Figure 1:
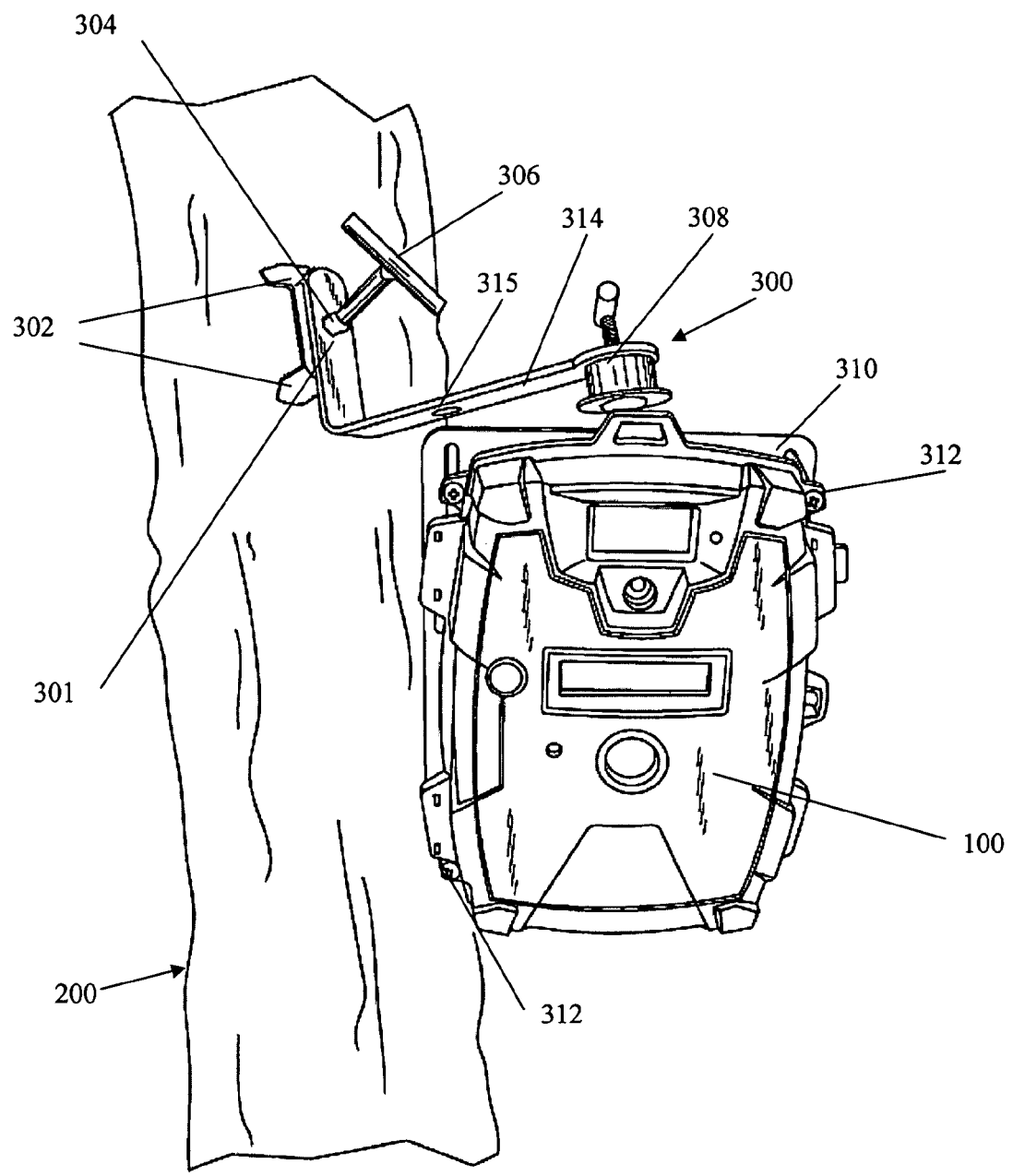
FIG. 1 is a perspective view of a game-security camera mounted to a tree utilizing a camera mounting system.

FIG. 1 is a perspective view of a game-security camera 100 mounted to a tree 200 utilizing an embodiment of a camera mounting system, system 300. System 300 includes a grip plate 301 that has four prongs 302 (two shown in FIG. 1), a screw through hole 304, and a lag screw bolt 306. Bolt 306 screws into tree 200 such that prongs 302 are firmly pressed into the tree. Prongs 302 are configured such that the grip plate can be positioned at any angle relative to the tree while still being able to securely mount camera 100 to tree 200 without slipping or turning. In embodiments, system 300 mounts a camera 100 to any tree having a diameter of greater than 1.5". In other embodiments, system 300 does not mount to a tree. Embodiments of system 300 mount to fence posts, stumps, and deadfalls. Embodiments of system 300 are also used with materials other than wood. Embodiments of system 300 mount cameras to any material that bolt 306 can be screwed into. It should also be noted that in some embodiments grip plates include attachment mechanisms other than lag screw bolts such as hooks, clamps, adhesives, and magnets. In those embodiments, system 300 can mount a camera to a material other than a material that can be screwed into.

Camera mounting system 300 also includes a ball swivel mechanism 308, a universal mounting plate 310, camera mounting bolts 312, bracket arm 314, and bracket arm slot 315. Bolts 312 are used to secure camera 100 to universal mounting plate 310. Ball swivel mechanism 308 attaches plate 310 to bracket arm 314. Ball swivel mechanism 308 is highly advantageous in many ways. One advantage is that it allows a great deal of flexibility in positioning camera 100. Swivel mechanism 308 permits 360° rotation of the camera positioning such that the camera can face the north, south, east, west, or any direction in between. Swivel mechanism 308 also permits 80° of forward tilt such that a camera can be positioned almost completely facing the sky, and 80° of backward tilt such that a camera can be position almost completely facing the ground. Finally, swivel mechanism 308 permits 80° of tilt in both side-to-side directions such that a pictures taken by a camera mounted at 80° will have the ground located in either the left or right sides of a picture.

It should be noted that embodiments of swivel mechanism 308 are not limited to the tilt or rotation capabilities illustrated in the examples above. For example, some embodiments provide for less rotation and tilt positioning capability, and other embodiments provide for greater rotation and tilt positioning capability. It should also be noted that in embodiments of camera mounting systems that include both a grip plate that can be positioned at any angle and a swivel mechanism, that the combination of grip plate and swivel mechanism provides greater positioning capability than either element would alone. When used in combination, a camera can be position in any direction.

Figure 2:
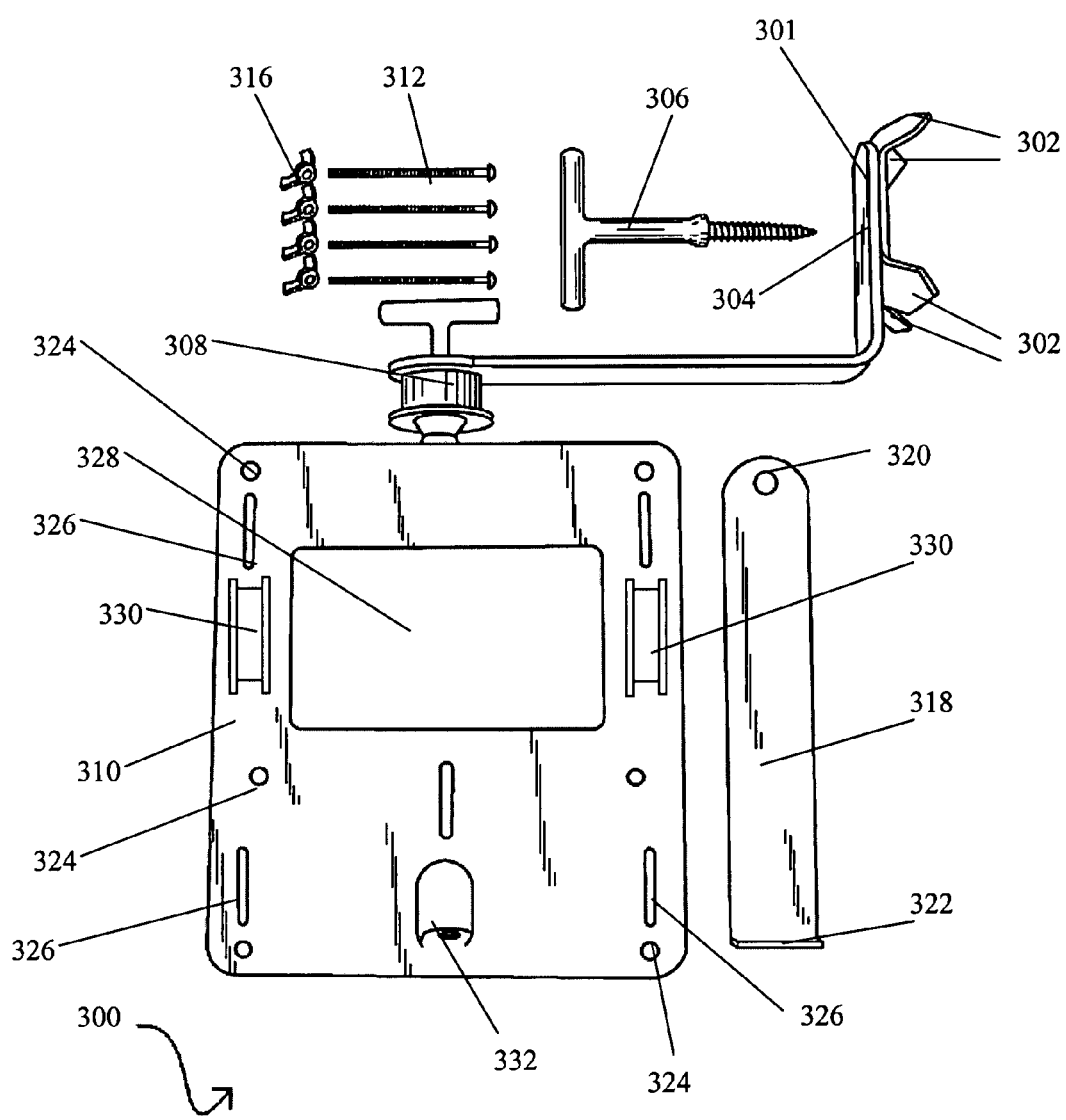
FIG. 2 is a perspective view of a camera mounting system partially disassembled.

FIG. 2 is a perspective view of an embodiment of a camera mounting system 300 partially disassembled. FIG. 2 shows in greater detail many of the elements discussed in regards to FIG. 1 such as camera mounting bolts 312, lag screw bolt 306, grip plate prongs 302, grip plate screw through hole 304, bracket arm 314, ball swivel mechanism 308, and universal mounting plate 310. FIG. 2 also shows elements of system 300 that were hidden by the camera or tree in FIG. 1. These elements include camera mounting wing nuts 316, lock-in place slide bar 318, slide bar securing aperture 320, slide bar flange 322, bolt holes 324, bolt slots 326, camera mounting aperture 328, pressed out slots 330 and bent-out locking tab 332.

In certain embodiments, cameras, such as camera 100 in FIG. 1, are secured to universal mounting plate 310 by inserting a camera mounting bolt 312 first through an aperture in a camera, then inserting the bolt through a bolt slot 326, and then attaching a camera mounting wing nut 316 to secure the bolt in place. Embodiments of bolt slots 326 are positioned in universal mounting plate 310 such that they are aligned with the apertures included in a wide variety of cameras. This allows for one mounting plate to be used with a large number of cameras of different types and from different manufactures. Similar to bolt slots 326, bolt holes 324 also work in combination with bolts 312 and wing nuts 316 to attach cameras to mounting plate 310. Also similar to bolt slots 326, in some embodiments, bolt holes 324 are positioned in plate 310 such that they can be used to work with apertures included in a wide variety of cameras to secure the cameras to a mounting plate. Embodiments of universal mounting plate 310 can include any number of holes 324 or slots 326.

Figure 3:
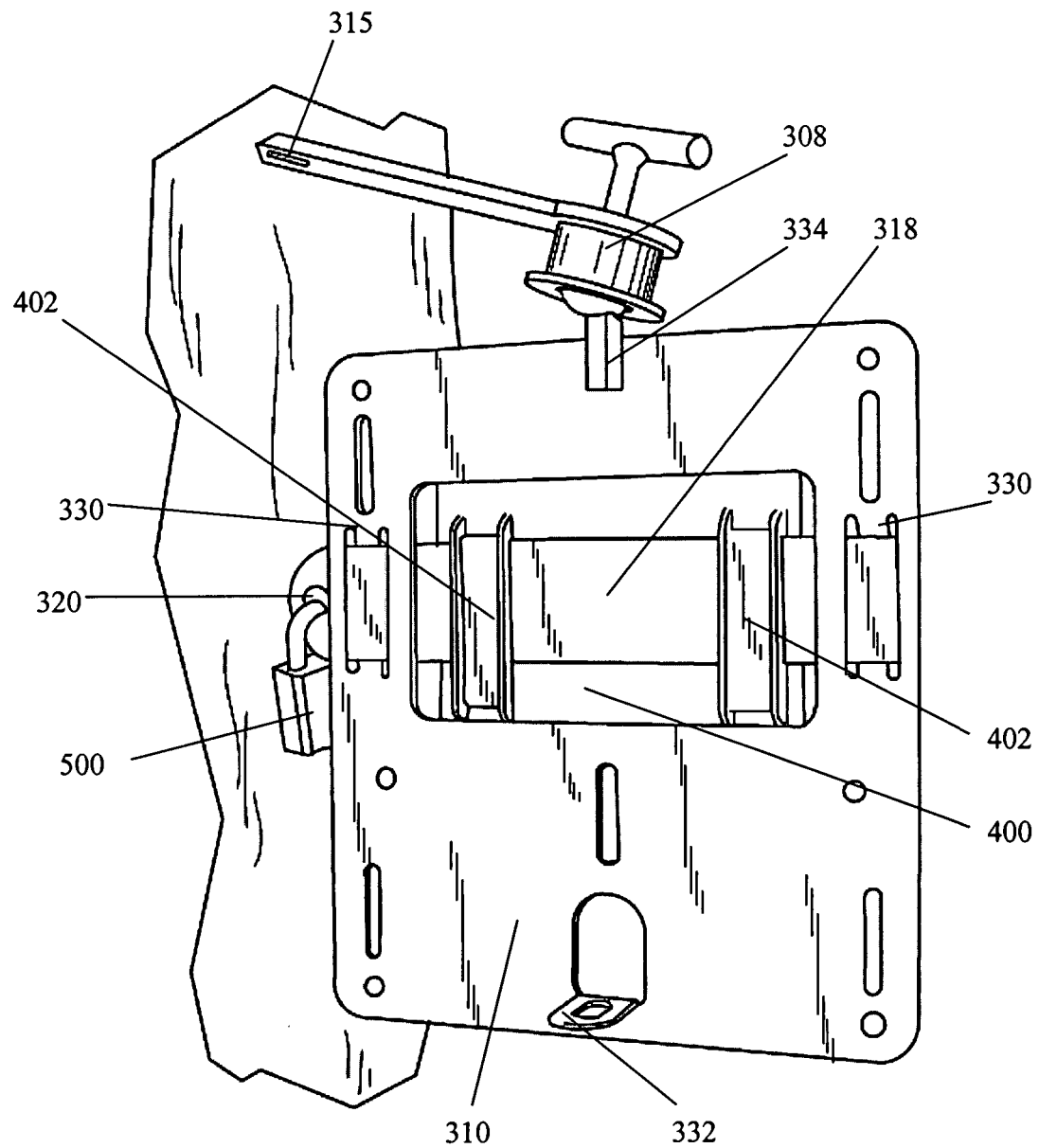
FIG. 3 is a perspective view of a lock-in place slide bar securing a camera to a universal mounting plate.

FIG. 3 is a perspective view of an embodiment of a lock-in place slide bar 318 securing a camera 400 to universal mounting plate 310. Some cameras do not include apertures such that bolt holes 324 or bolt slots 326 can be used to secure them to plate 310. Some cameras, such as camera 400, include camera mounting straps such as straps 402 shown in FIG. 3. In these cases, the cameras can be secured to the mounting plate by inserting lock-in place slide bar 318 through one pressed out slot 330, then through the camera mounting straps 402, and then finally inserting bar 318 through a second pressed out slot 330. One end of slide bar 318 is secured to plate 310 by the slide bar flange 322 (shown in FIGS. 2 and 5) resting against a pressed out slot 330. In an embodiment, the other bar 318 end is secured to plate 310 by attaching a locked padlock 500 through slide bar securing aperture 320.

Similar to slide bar securing aperture 320, bent-out locking tab 332 also includes an aperture that can be used in combination with some cameras, to secure a camera to plate 310 utilizing a padlock 500 or similar device. In some embodiments, a lock is used in combination with a cable. In FIG. 3, tab 332 is shown to extend away from the camera. In other embodiments, tab 332 extends towards the camera side. In yet other embodiments, tabs 332 are utilized to support weight. In some embodiments, bracket arm slot 315 (shown in FIGS. 1 and 3) is also used in combination with a cable and/or lock to secure certain cameras to mounting plate 310.

Figure 4:
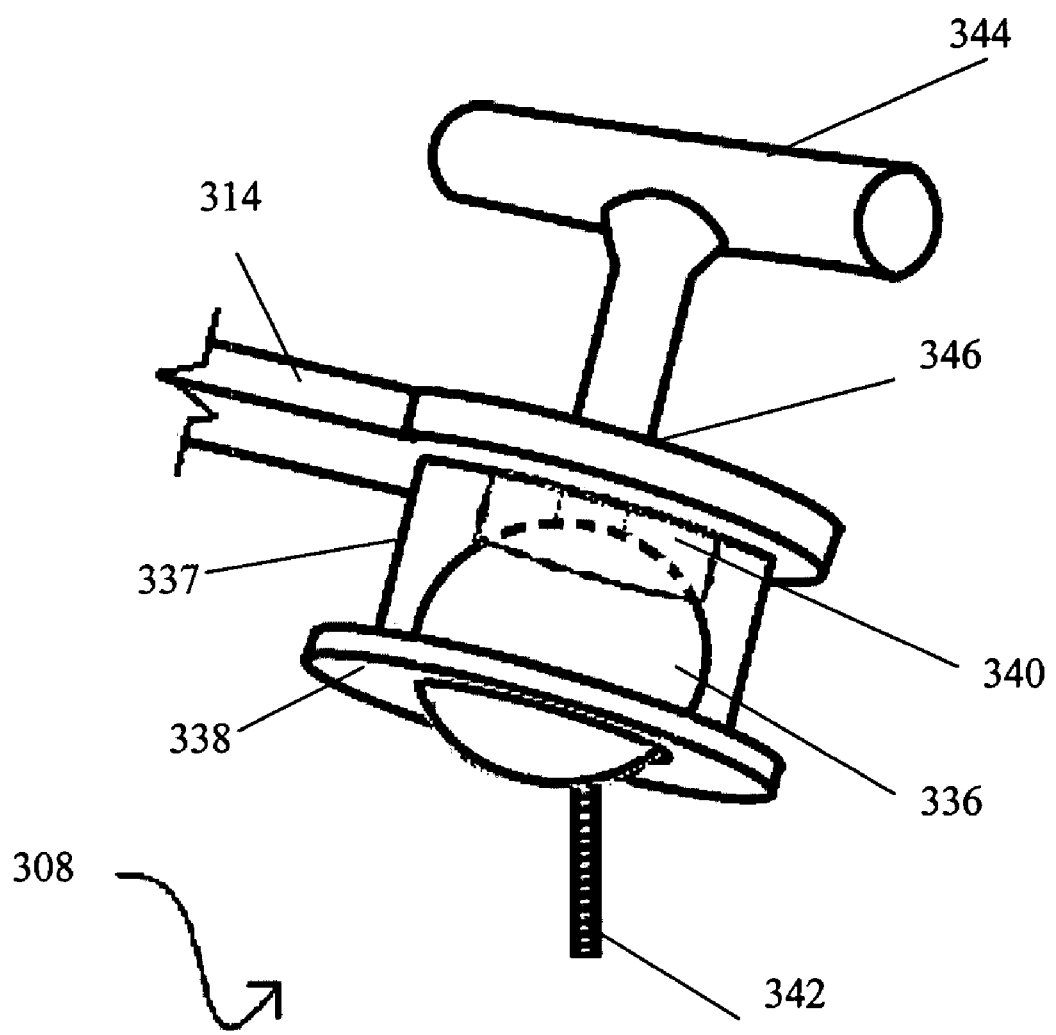
FIG. 4 is a perspective view of a ball swivel mechanism with the internal components visible.

FIG. 4 is a perspective view of an embodiment of a ball swivel mechanism 308 with the internal components visible. In mechanism 308, a ball swivel ball 336 is enclosed in a ball enclosure tube 337, and is supported by a ball enclosure washer 338 and by a ball-support tube 340. In an embodiment, tube 304 is made from a synthetic material tube, such as but not limited to a polypropylene tube, and is pressed into ball swivel mechanism 308 during assembly such that it provides constant pressure to ball 336. In an embodiment, ball 336 is drilled and tapped such that ball swivel set screw stud 342 can be attached. In some embodiments, universal mounting plates 310 include a threaded coupler nut 334 (shown in FIG. 3) that is threaded onto ball swivel set screw stud 342 to join the universal mounting plate 310 to the ball swivel mechanism. Stud 342 is able to move within the swivel mechanism enclosure through the aperture in washer 338. This allows for the rotation and tilting capabilities previously discussed.

Ball swivel mechanism 308 also includes a threaded T-bolt 344 that fits through a T-bolt hole 346 in bracket arm 314. When tightened, the end of T-bolt 344 contacts the surface of ball 336 and applies pressure to the back of ball such that an attached universal mounting plate and camera can be securely held in place.

Figure 5:
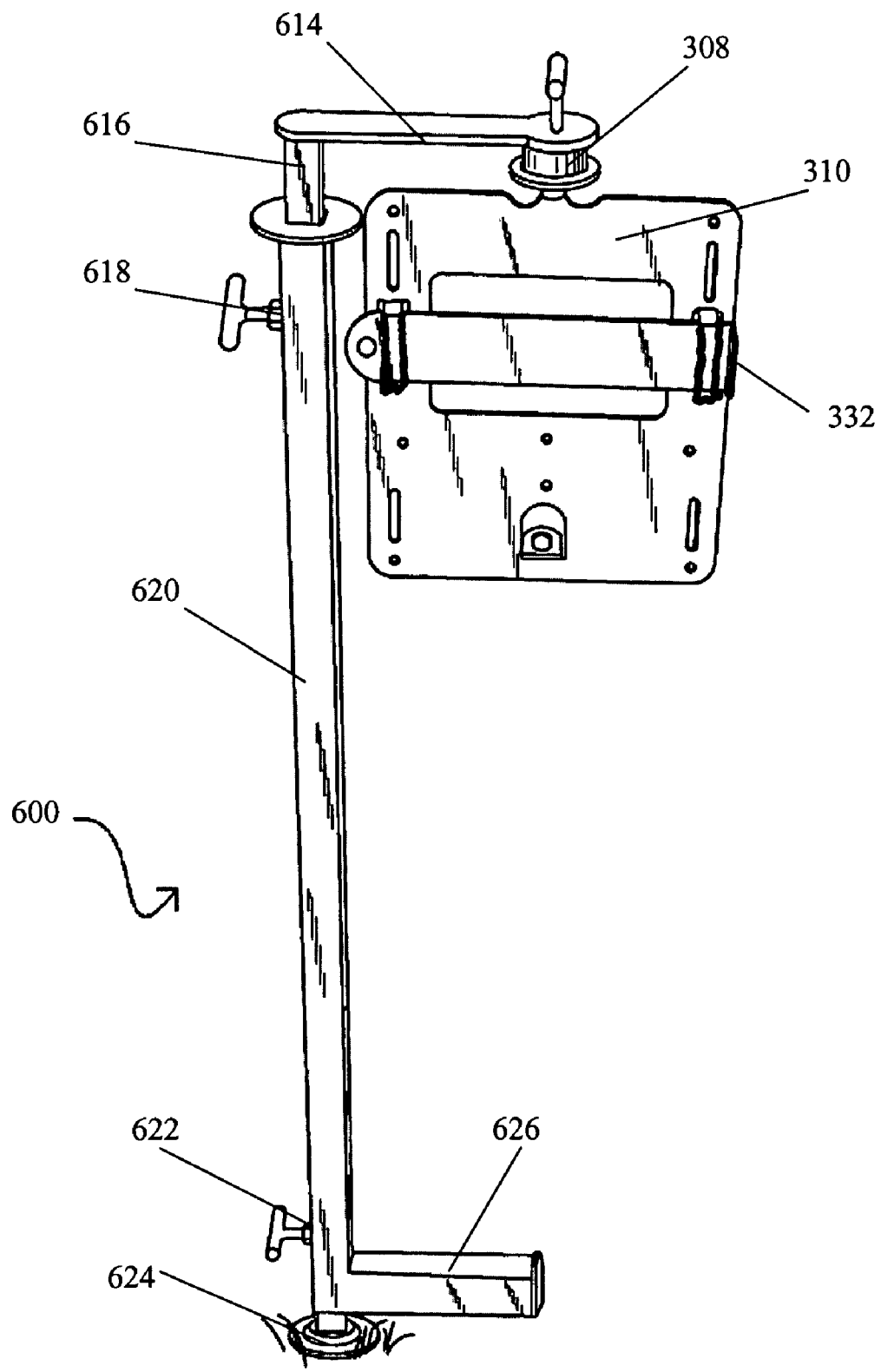
FIG. 5 is a perspective view of a telescopic monopod camera mounting system.

FIG. 5 is a perspective view of an embodiment of a telescopic monopod camera mounting system 600. Embodiments of system 600 include universal mounting plates 310 and ball swivel mechanisms 308 which were previously discussed. Other embodiments of system 600 include camera attachment mechanisms and positioning mechanisms other than plates 310 and swivel mechanisms 308. System 600 includes a telescopic bracket arm 614, a telescopic boom 616, a telescopic boom adjustment mechanism 618, a telescopic base 620, a drive stake attachment mechanism 622, a drive stake 624, and a step-in-ground bar 626. Bracket arm 614 attaches the ball swivel mechanism 608 to telescopic boom 616. In some embodiments, the size of the outer surface of telescopic boom 616 is smaller than the size of the inner surface of telescopic base 620, and telescopic boom is fit into base 620. This allows for the height of boom 616 to be increased or decreased by putting either more or less of boom 616 in base 620. Telescopic boom adjustment mechanism 618 holds boom 616 at the desired position by putting force on the boom by means such as, but not limited to pressure from a screw or clamp.

Drive stake 624 (illustrated in FIG. 5 as being stuck in the ground) secures system 600 to the ground. Step-in-ground bar 626 can illustratively be used to push stake 624 into the ground by providing a convenient place for a person to apply pressure. Bar 626 can also function as a mechanism to prevent base 620 from being entered into the ground. Similarly, drive stake divider 630 (labeled in FIG. 6 discussed below) can also function to prevent base 620 from entering the ground.

It is worth noting some of the advantages of system 600. Like system 300, system 600 positions cameras to a great variety of positions that a user may desire. System 600 also provides other advantages such that the system can independently support a camera (i.e. a tree or other article is not needed), and the system provides great convenience for height adjustment.

Figure 6:
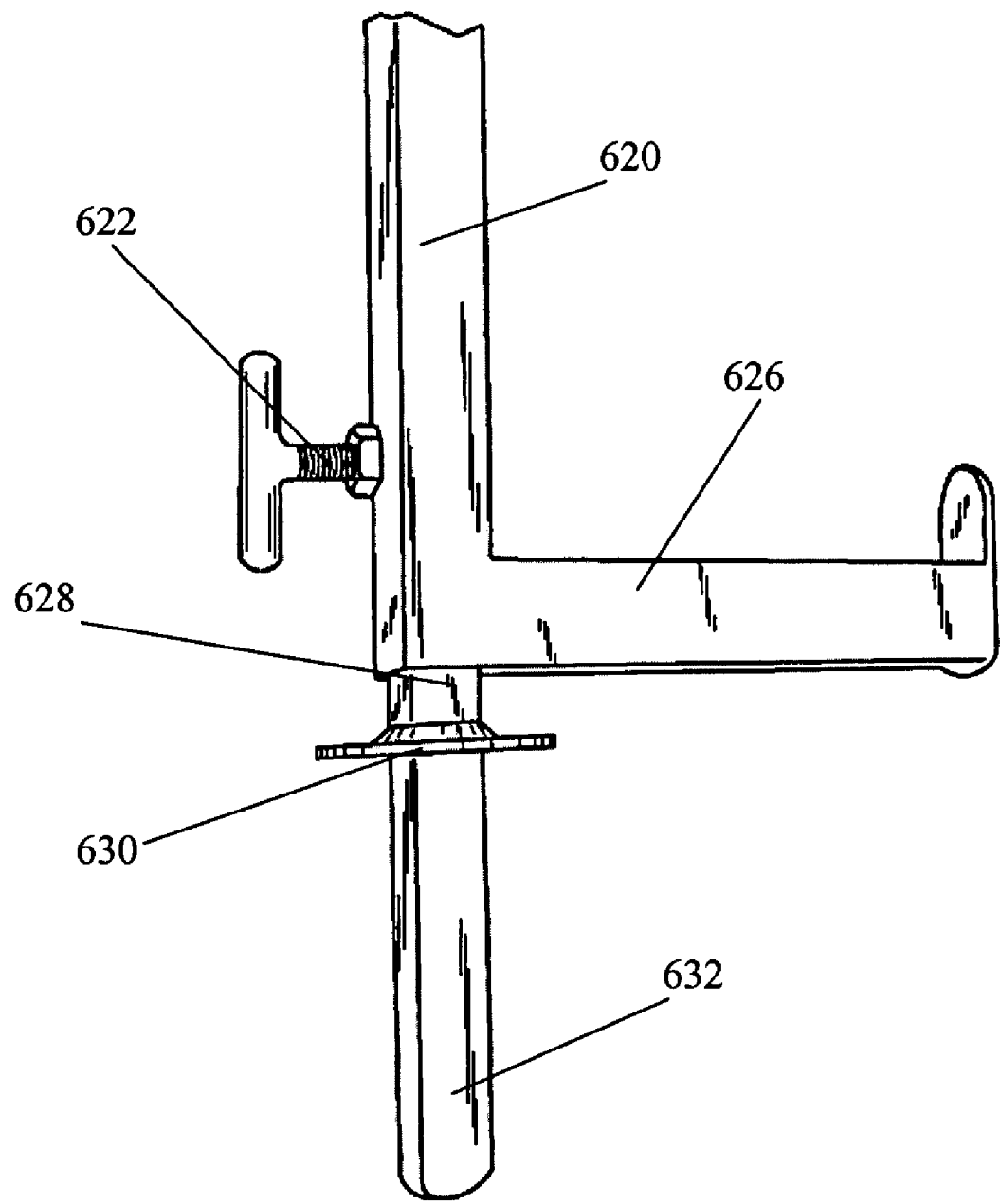
FIG. 6 is a perspective view of the bottom of a telescopic monopod camera mounting system.

FIG. 6 is a perspective view of an embodiment of the bottom of system 600. FIG. 6 shows features that were concealed in FIG. 5. In an embodiment, drive stake 624 (labeled in FIG. 5) includes a drive stake short portion 632, a drive stake long portion 628, and a drive stake divider 630. Both portions 628 and 632 have an outer surface that is smaller than the inner surface of telescopic base 620. Both are also designed to fit into base 620 and to be secured to the base utilizing drive stake attachment mechanism 622. In an embodiment, drive stake 624 is designed such that a user can choose between using short portion 632 and long portion 628 to secure monopod 632 to the ground. In another embodiment short portion 632 is designed to stick out when system 600 is not in use, and long portion 628 stick out when system 600 is in use. Embodiments of portions 628 and 632 include any designs that are useful in securing the monopod to the ground. In one embodiment, short portion 628 is shorter and has a wider outer surface than long portion 632. In some embodiments, the long and short portions are tapered such that the end first entering the ground is narrower than the last portion entering the ground such that the wider top portion provides a tighter fit with the ground.

Figure 7:
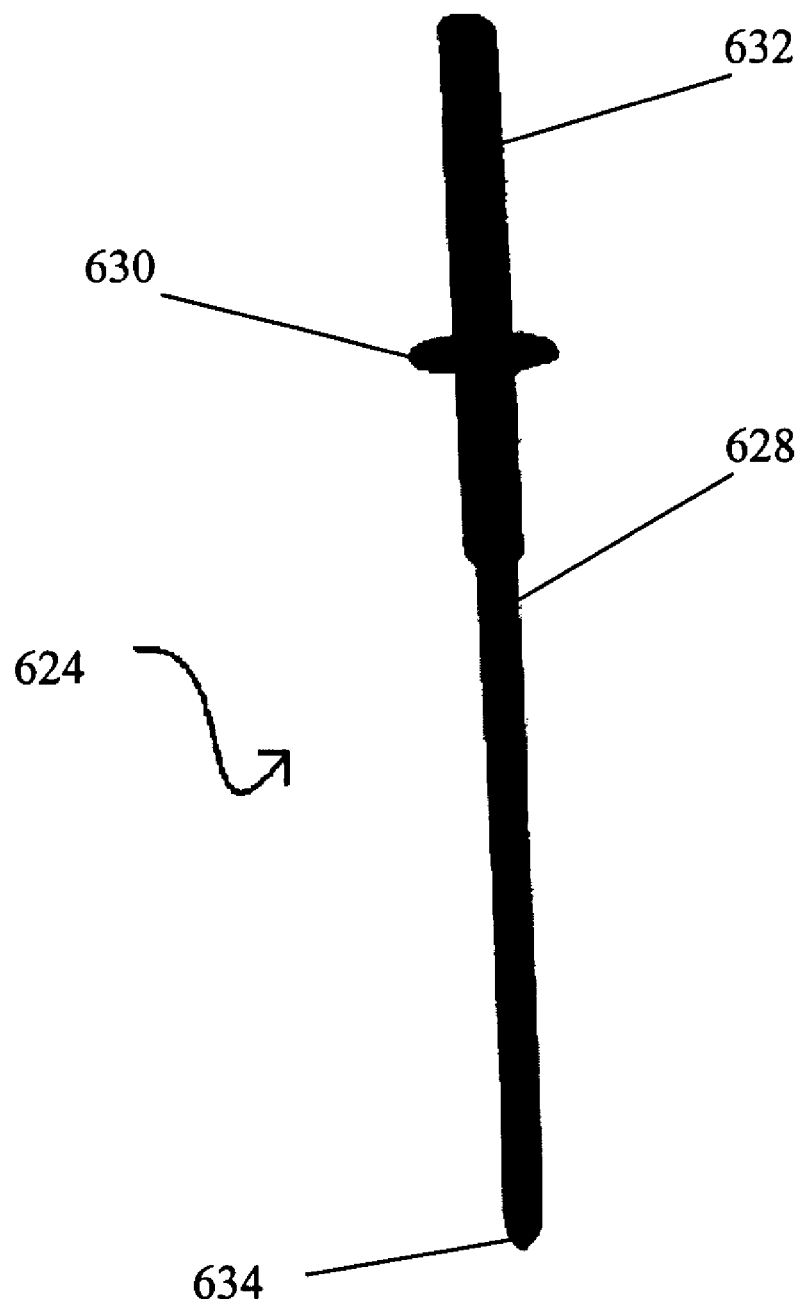
FIG. 7 is a side view of a drive stake.

FIG. 7 is a side view of drive stake 624 unattached to telescopic base 620 (shown in FIGS. 5 and 6). FIG. 7 shows an embodiment of a drive stake long portion 628 that was concealed in FIGS. 5 and 6. In some embodiments, portion 628 has a pointy tip 634 such that stake 624 can be easily pushed into the ground. In an embodiment, short portion 632 provides a contact surface such that stake 624 can be driven into hard ground utilizing an object such as a hammer. The telescopic base 620 can then be attached to stake 624. This provides an alternative method of securing telescopic monopod camera mounting system 600 to the ground, as opposed to the previously described method of utilizing step-in-ground bar 626.

Embodiments of camera mounting systems such as systems 300 and 600 are made from any material and have any finish. Some embodiments are made from steel such as 14 gauge steel and have powder coat finishes. In some embodiments, parts of the systems are formed from separate pieces, and in other embodiments, multiple parts are formed from one piece. For example, in some embodiments ball swivel mechanism 308 and bracket arm 614 (shown in FIG. 5) are made from separate pieces and then connected, and alternatively in other embodiments, they are integrally formed from one piece.

It is worth noting that embodiments of camera mounting systems include parts of any shape and size. For example, bracket arm 314 (shown in FIG. 2) is illustrated as being a flat material. Embodiments of bracket arm 314 include every shape and size such as a cylindrical bracket arm. Also for example, universal mounting plate 310 (also shown in FIG. 2) is illustrated as being rectangular. Embodiments of universal mounting plates are square, circular, or any other shape including very irregular shapes.

Finally, it is worth noting that although the present invention has been discussed in terms of certain embodiments, that various modifications and alterations of this invention will become apparent to those skilled in the art without departing from the scope and spirit of this invention. It should be understood that this invention is not to be unduly limited to the illustrative embodiments set forth herein.

What is claimed is:

1. A camera mounting apparatus for supporting a camera, comprising:
    a bracket arm;
    a ball swivel mechanism connected to the bracket arm;
    a camera mounting plate connected to the ball swivel mechanism such that the camera mounting plate is manually adjustable to any of a range of different angular positions relative to the bracket arm to provide flexibility in positioning the camera; and
    wherein the camera mounting plate comprises:
        two pressed out slots;
        a slide bar that includes a flange and a securing aperture; and
        wherein the slide bar slides through the pressed out slots and is held in place utilizing the flange for securing the camera to the mounting plate.

2. The apparatus of claim 1, further comprising a grip plate connected to the bracket arm.

3. The apparatus of claim 2, wherein the ball swivel mechanism is positioned proximate a first end of the bracket arm and the grip plate is positioned on a second end of the bracket arm.

4. The apparatus of claim 2, wherein the grip plate comprises a lag screw bolt and a screw through hole.

5. The apparatus of claim 4, wherein the grip plate further comprises at least one prong.

6. The apparatus of claim 2, wherein the grip plate and bracket arm are formed from one piece.

7. The apparatus of claim 2, wherein the grip plate is non-parallel relative to at least a portion of the bracket arm.

8. The apparatus of claim 1, wherein the ball swivel mechanism comprises:
    a ball;
    a bolt that contacts the ball surface;
    a washer opposite the bolt that contacts the ball surface; and
    wherein the ball is held in a fixed position by pressure exerted by the bolt and the washer.

9. The apparatus of claim 8, wherein the bolt is a threaded T-bolt.

10. The apparatus of claim 8 further comprising a set screw stud connected to the ball.

11. The apparatus of claim 1, further comprising:
    a monopod connected to the bracket arm such that the height of the bracket arm relative to a ground surface is manually adjustable.

12. The apparatus of claim 11, wherein the monopod comprises a telescopic boom that fits within a telescopic base.

13. The apparatus of claim 11, wherein the camera mounting plate is suspended below the bracket arm.

14. The apparatus of claim 11, wherein the monopod comprises a step-in-ground bar.

* * * * *